United States Patent
Morita et al.

(10) Patent No.: US 10,072,114 B2
(45) Date of Patent: Sep. 11, 2018

(54) METHOD FOR PRODUCING MODIFIED CONJUGATED DIENE POLYMER, POLYMER COMPOSITION, CROSSLINKED POLYMER AND TIRE

(71) Applicant: JSR CORPORATION, Minato-ku (JP)

(72) Inventors: Hiroyuki Morita, Tokyo (JP); Takahiro Kawai, Tokyo (JP); Takeshi Yuasa, Tokyo (JP); Koichiro Tani, Tokyo (JP); Koji Okada, Tokyo (JP); Ryoji Tanaka, Tokyo (JP)

(73) Assignee: JSR CORPORATION, Minato-ku (JP)

( * ) Notice: Subject to any disclaimer, the term of this patent is extended or adjusted under 35 U.S.C. 154(b) by 469 days.

(21) Appl. No.: 14/431,128

(22) PCT Filed: Sep. 18, 2013

(86) PCT No.: PCT/JP2013/075178
§ 371 (c)(1),
(2) Date: Mar. 25, 2015

(87) PCT Pub. No.: WO2014/050665
PCT Pub. Date: Apr. 3, 2014

(65) Prior Publication Data
US 2015/0252133 A1    Sep. 10, 2015

(30) Foreign Application Priority Data

Sep. 25, 2012   (JP) ................................. 2012-211348

(51) Int. Cl.
| | | |
|---|---|---|
| *C08F 236/10* | (2006.01) | |
| *C08C 19/25* | (2006.01) | |
| *C08C 19/26* | (2006.01) | |
| *B60C 1/00* | (2006.01) | |
| *C08C 19/20* | (2006.01) | |
| *C08L 15/00* | (2006.01) | |
| *C08C 19/44* | (2006.01) | |
| *C08K 3/36* | (2006.01) | |

(52) U.S. Cl.
CPC .............. *C08F 236/10* (2013.01); *B60C 1/00* (2013.01); *C08C 19/20* (2013.01); *C08C 19/25* (2013.01); *C08C 19/26* (2013.01); *C08C 19/44* (2013.01); *C08K 3/36* (2013.01); *C08L 15/00* (2013.01)

(58) Field of Classification Search
CPC ......... C08C 19/22; C08C 19/25; C08C 19/26; C08C 19/44; C08L 15/00; C08F 236/04; C08F 236/06; C08F 236/10; C08F 136/04; C08F 136/06; C08F 36/04; C08F 36/06

See application file for complete search history.

(56) References Cited

U.S. PATENT DOCUMENTS

| | | | | |
|---|---|---|---|---|
| 8,980,987 | B2 * | 3/2015 | Tanaka | C08K 3/04 524/492 |
| 9,212,276 | B2 * | 12/2015 | Tanaka | C08C 19/25 |
| 2008/0262163 | A1 | 10/2008 | Bae | |
| 2009/0247696 | A1 | 10/2009 | Fujii et al. | |
| 2011/0207879 | A1 | 8/2011 | Ito et al. | |
| 2011/0224351 | A1 * | 9/2011 | Mori | B60C 1/0016 524/458 |
| 2013/0085228 | A1 * | 4/2013 | Tanaka | C08C 19/25 524/572 |
| 2013/0245192 | A1 * | 9/2013 | Tanaka | C08K 3/04 524/575 |
| 2015/0183914 | A1 | 7/2015 | Kawai et al. | |

FOREIGN PATENT DOCUMENTS

| | | | |
|---|---|---|---|
| EP | 2 876 115 A1 | 5/2015 | |
| JP | 04-149236 | * | 5/1992 |
| JP | 4 149236 | | 5/1992 |
| JP | 2001 139633 | | 5/2001 |
| JP | 2003 171418 | | 6/2003 |
| JP | 2010 77386 | | 4/2010 |
| JP | 2011 195802 | | 10/2011 |
| WO | 2010 070875 | | 6/2010 |
| WO | 2011 155326 | | 12/2011 |
| WO | WO 2011/155326 A1 | * | 12/2011 |
| WO | WO 2012/073880 A1 | * | 6/2012 |

OTHER PUBLICATIONS

JP 04-149236, May 1992, machine translation.*
International Search Report dated Oct. 22, 2013 in PCT/JP13/075178 filed Sep. 18, 2013.
Extended European Search Report dated Apr. 19, 2016 in Patent Application No. 13842003.9.

* cited by examiner

Primary Examiner — Roberto Rabago
(74) Attorney, Agent, or Firm — Oblon, McClelland, Maier & Neustadt, L.L.P.

(57) ABSTRACT

A modified conjugated diene polymer obtained by modifying a conjugated diene polymer that is obtained by polymerizing a conjugated diene compound or polymerizing a conjugated diene compound and an aromatic vinyl compound is produced by a production method comprising a first modification step wherein an unsaturated binding site at least either in the skeleton or at the side chain of the conjugated diene polymer is reacted with a first compound having a group 4 or 13 element of the periodic table.

5 Claims, No Drawings

METHOD FOR PRODUCING MODIFIED CONJUGATED DIENE POLYMER, POLYMER COMPOSITION, CROSSLINKED POLYMER AND TIRE

TECHNICAL FIELD

The present invention relates to a method for producing a modified conjugated diene polymer, a polymer composition, a crosslinked polymer, and a tire.

BACKGROUND ART

As rubbers for automobile tires, conjugated diene rubbers (e.g., styrene-butadiene copolymers) obtained by emulsion polymerization methods or solution polymerization methods have been hitherto known. In recent years, it has been required to further improve low fuel consumption performance of automobiles, and various conjugated diene rubbers for realizing excellent low fuel consumption performance have been proposed. For example, as a rubber for automobile tires, there has been proposed a modified conjugated diene polymer in which an end of a conjugated diene polymer is modified using a compound having an amino group and an alkoxysilyl group (e.g., see Patent Document 1). Moreover, there have been proposed a modified conjugated diene polymer in which a silicon atom is bound to the carbon atom constituting the main chain of the polymer and also an amino group is bound to the silicon atom and a modified conjugated diene polymer in which a benzene ring having an amino group is bound (e.g., see Patent Documents 2 and 3).

RELATED ART DOCUMENTS

Patent Document

Patent Document 1: JP-A-2003-171418
Patent Document 2: JP-A-2010-77386
Patent Document 3: JP-A-2011-195802

SUMMARY OF THE INVENTION

Problems that the Invention is to Solve

Under financial circumstances such as a price increase of gasoline and environmental circumstances such as global warming resulting from carbon dioxide emissions, as a rubber for automobile tires, it has been desired to realize a material more excellent in low fuel consumption performance than conventional one.

The present invention has been made in view of the above problem and a main object of the invention is to provide a method for producing a modified conjugated diene polymer for obtaining a rubber composition excellent in low fuel consumption performance in uses such as automobile tires.

Means for Solving the Problems

In order to solve the problem of the conventional technologies as mentioned above, the present inventors have made intensive studies and have focused on the modification of the main chain or side chain of a conjugated diene polymer utilizing the addition of a specific compound to a carbon-carbon double bond. As a result, they have found that it is possible to solve the above problem by modifying the conjugated diene polymer based on the focused point and thus have accomplished the present invention. Specifically, the invention provides a method for producing a modified conjugated diene-based polymer, a polymer composition, a crosslinked polymer, and a tire to be described below.

In one aspect, the invention provides a method for producing a modified conjugated diene polymer obtained by modifying a conjugated diene polymer that is obtained by polymerizing a conjugated diene compound or polymerizing a conjugated diene compound and an aromatic vinyl compound, the method comprising a first modification step wherein an unsaturated binding site at least either in the skeleton or at the side chain of the conjugated diene polymer is reacted with a first compound having a group 4 or 13 element of the periodic table.

According to the present production method, there can be produced a modified conjugated diene polymer capable of affording a polymer composition excellent in low fuel consumption performance (low hysteresis loss properties) in uses such as automobile tires. Moreover, the modified conjugated diene polymer produced by the production method is further also excellent in wet skid resistance and can be suitably used in uses such as automobile tires.

In another aspect, the invention provides a polymer composition comprising the modified conjugated diene polymer obtained by the above production method, silica, and a crosslinking agent. Moreover, it provides a crosslinked polymer obtained by crosslinking the polymer composition. Furthermore, it provides a tire using the crosslinked polymer at least as a material of a tread or a side wall.

MODES FOR CARRYING OUT THE INVENTION

[1] Modified Conjugated Diene Polymer and Method for Producing the Same

The method for producing a modified conjugated diene polymer of the invention comprises a step (first modification step) of performing a modification treatment of an unsaturated binding site at least either in the skeleton or at the side chain of a conjugated diene polymer. The following will illustrates the first modification step and the other steps carried out as needed.

<Polymerization Step>

The conjugated diene polymer in the invention can be obtained by polymerizing a conjugated diene compound or a conjugated diene compound and an aromatic vinyl compound.

Here, examples of the conjugated diene compound used in the polymerization include 1,3-butadiene, isoprene, 2,3-dimethyl-1,3-butadine, 1,3-pentadiene, 1,3-hexadiene, 1,3-heptadiene, 2-phenyl-1,3-butadiene, 3-methyl-1,3-pentadiene, 2-chloro-1,3-butadine, and the like. Of these, 1,3-butadine, isoprene, 2,3-dimethyl-1,3-butadiene, and the like are preferable. These compounds may be used either alone or as a combination of two or more thereof.

Moreover, examples of the aromatic vinyl compound include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinylpyridine, diphenylethylene, and the like. Also, as the aromatic vinyl compound, tertiary amino group-containing diphenylethylenes such as 1-(4-N,N-dimethyl-aminophenyl)-1-phenylethylene may be used. Of these, styrene is particularly preferable. The aromatic vinyl compounds may be used either alone or as a combination of two or more thereof.

Incidentally, all the conjugated diene polymers and aromatic vinyl compounds exemplified in the above have a similar action, from the viewpoint that it is possible to obtain the conjugated diene polymer having an active end. Therefore, even one not described in Examples described later can be used in the invention.

The conjugated diene polymer obtained by the present polymerization step may be a homopolymer of the conjugated diene compound but, from the viewpoint of increasing the strength of a rubber, a copolymer of the conjugated diene compound and the aromatic vinyl compound is preferable. In particular, in view of a high living nature in anionic polymerization, a copolymer of 1,3-butadiene and styrene is preferable.

In the copolymer of the conjugated diene compound and the aromatic vinyl compound, the amount of the aromatic vinyl compound to be used is preferably from 3 to 55% by mass and more preferably from 5 to 50% by mass based on the total amount of the conjugated diene compound and the aromatic vinyl compound to be used in the polymerization, from the viewpoint of a good balance between low hysteresis loss properties and wet skid resistance in the case of the application to tire uses.

At the time of polymerization, a monomer other than the conjugated diene compounds and aromatic vinyl compounds may be used. Examples of the other monomer include acrylonitrile, methyl (meth)acrylate, ethyl (meth)acrylate, hydroxyethyl (meth)acrylate, and the like. The amount of the other monomer to be used is preferably less than 25% by mass, more preferably 15% by mass or less, and further preferably 10% by mass or less based on the total amount of the monomers to be used in the polymerization.

The conjugated diene polymer in the invention can be produced by performing anionic polymerization using monomer(s) including at least the conjugated diene compound. As a polymerization method, any one of a solution polymerization method, a gas-phase polymerization method, and a bulk polymerization method may be used but the solution polymerization method is particularly preferable. Furthermore, as a polymerization type, either of a batch type and a continuous type may be used.

In the case where the solution polymerization method is used, as one example of specific polymerization methods, there may be mentioned a method of subjecting the monomer(s) including the conjugated diene compound to polymerization in an organic solvent in the presence of a polymerization initiator and a randomizer which is used as needed.

As the polymerization initiator, at least either of an alkali metal compound and an alkaline earth metal compound can be used. As the alkali metal compound, one usually used as an initiator for anionic polymerization can be used and examples thereof include alkyllithiums such as methyllithium, ethyllithium, n-propyllithium, n-butyllithium, sec-butyllithium, and tert-butyllithium, 1,4-dilithiobutane, phenyllithium, stilbenelithium, naphthyllithium, naphthylsodium, naphthylpotassium, di-n-butylmagnesium, di-n-hexylmagnesium, ethoxypotassium, calcium stearate, and the like. Of these, lithium compounds are preferable.

Moreover, as the alkali metal compound or the alkaline earth metal compound as the polymerization initiator, a compound having a functional group that interacts with silica can be also used. By performing the polymerization in the presence of such a functional group-containing compound (hereinafter also referred to as compound (R)), a functional group that interacts with silica can be introduced into a polymerization initiation end of the conjugated diene polymer. Herein, "interaction" means that a covalent bond is formed between molecules or an intermolecular force weaker than a covalent bond (e.g., an electromagnetic force working between molecules, such as ion-dipole interaction, dipole-dipole interaction, a hydrogen bond, Van der Waals force) is formed between molecules. Moreover, the "functional group that interacts with silica" means a group having at least one atom that interacts with silica, such as a nitrogen atom, a sulfur atom, a phosphorus atom, or an oxygen atom.

The compound (R) is not particularly limited as long as it has an alkali metal or an alkaline earth metal and a functional group that interacts with silica. In particular, the compound is preferably a reaction product of a lithium compound such as an alkyllithium or an aromatic lithium with a nitrogen-containing compound such as a secondary amine compound. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, 1,3-ditrimethylsilyl-1,3,5-triazinane, and the like.

In the case of performing the polymerization in the presence of the compound (R), the compound (R) may be prepared by mixing at least either of the alkali metal compound and the alkaline earth metal compound with the compound having the functional group that interacts with silica beforehand and then the prepared compound (R) may be added into a polymerization system. Alternatively, the compound (R) may be prepared by adding at least either of the alkali metal compound and the alkaline earth metal compound and the compound having the functional group that interacts with silica into the polymerization system and mixing the both in the polymerization system. The amount of the compound (R) to be used is preferably from 0.2 to 20 mmol based on 100 g of the monomer(s) to be used in the polymerization.

The randomizer can be used for the purpose of adjustment and the like of the content of vinyl bonds (1,2-bonds and 3,4-bonds) (vinyl content). Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, tetramethylethylenediamine, and the like. They may be used either alone or as a combination of two or more thereof.

The organic solvent to be used in the polymerization may be any one as long as it is a reaction-inactive organic solvent. For example, an aliphatic, alicyclic or aromatic hydrocarbon or the like can be used. In particular, hydrocarbons having 3 to 8 carbon atoms are preferable. Specific examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and the like. The organic solvents may be used either alone or as a combination of two or more thereof.

In the case where the solution polymerization is used, the monomer concentration in a reaction solvent is preferably from 5 to 50% by mass and more preferably from 10 to 30% by mass, from the viewpoint of maintaining a balance between productivity and easiness of polymerization control. The temperature of the polymerization reaction is preferably from −20 to 150° C., more preferably from 0 to 120° C., and particularly preferably from 20 to 100° C. The polymerization reaction is preferably conducted under a pressure enough to keep the monomer(s) substantially in a liquid phase. Such a pressure can be obtained by a method of pressurizing the inside of a reactor with a gas inactive to the polymerization reaction, or a similar method.

As above, a conjugated diene polymer having an active end can be obtained by using the compound having an alkali metal or an alkaline earth metal as the polymerization initiator.

The weight-average molecular weight (Mw) of the conjugated diene polymer in the invention in terms of polystyrene (GPC) is preferably from $1.0 \times 10^5$ to $2.0 \times 10^6$. When Mw is smaller than $1.0 \times 10^5$, the low fuel consumption performance and wear resistance tend to decrease in the crosslinked polymer obtained using the polymer composition containing the modified conjugated diene polymer of the invention. When Mw is larger than $2.0 \times 10^6$, workability of the polymer composition tend to decrease. Mw is more preferably from $1.5 \times 10^5$ to $1.5 \times 10^6$ and further preferably from $2.0 \times 10^5$ to $1.0 \times 10^6$.

Moreover, the vinyl content is preferably from 30 to 65% by mass, more preferably 33 to 62% by mass, and further preferably from 35 to 60% by mass. When the vinyl content is less than 30% by mass, the grip properties are prone to decrease exceedingly and, when the content exceeds 65% by mass, the wear resistance tends to get worse. Incidentally, the vinyl content is a value measured by $^1$H-NMR.

<End Modification Step>

The production method of the invention may include an end modification step wherein an active end of the conjugated diene polymer obtained in the above polymerization is reacted with a compound having a functional group that interacts with silica (third compound, hereinafter also referred to as "end-modifying agent") to modify a polymer end. By the step, the functional group that interacts with silica can be introduced into a polymerization termination end of the conjugated diene polymer.

As the end-modifying agent is not particularly limited as long as it has a functional group that interacts with silica and is capable of reacting with the polymerization active end. Preferable examples of the end-modifying agent include the following (I) to (III):

(I) a compound (a-1) represented by the following formula (1):

[Chem 1]

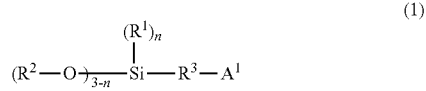

(1)

wherein $A^1$ is a monovalent functional group which has at least one atom selected from the group consisting of a nitrogen atom, a phosphorus atom, and a sulfur atom, does not have an active hydrogen, and binds to $R^3$ with the nitrogen atom, the phosphorus atom, or the sulfur atom; $R^1$ and $R^2$ are each a hydrocarbyl group, $R^3$ is a hydrocarbylene group, and n is an integer of 0 to 2, provided that, in the case where $R^1$ and $R^2$ exist in plurality, a plurality of the groups $R^1$ and $R^2$ may be each the same or different;

(II) a compound (a-2) having, in the molecule, at least one functional group (x1) selected from the group consisting of a cyclic ether group and a (thio)carbonyl group and a group (x2) different from the functional group (x1), which has at least one atom selected from the group consisting of a nitrogen atom, a phosphorus atom, an oxygen atom, and a sulfur atom and does not have an active hydrogen;

(III) a compound (a-3) having two or more iso(thio) cyanate groups in the molecule; and the like. As the end-modifying agent, they may be used either alone or as a combination of two or more thereof. Incidentally, herein, the (thio)carbonyl group means a carbonyl group and a thiocarbonyl group and the iso(thio)cyanate group means an isocyanate group and an isocyanate group.

[Compound (a-1)]

In the above formula (1), the hydrocarbyl group of $R^1$ and $R^2$ is preferably a linear or branched alkyl group having 1 to 20 carbon atoms, a cycloalkyl group having 3 to 20 carbon atoms, or an aryl group having 6 to 20 carbon atoms.

$R^3$ is preferably a linear or branched alkanediyl group having 1 to 20 carbon atoms, a cycloalkylene group having 3 to 20 carbon atoms, or an arylene group having 6 to 20 carbon atoms.

n is preferably 0 or 1 from the viewpoint of increasing the reactivity with the conjugated diene polymer.

$A^1$ has at least one atom selected from the group consisting of a nitrogen atom, a phosphorus atom, and a sulfur atom and binds to $R^3$ with the atom. Moreover, the nitrogen atom, the phosphorus atom, or the sulfur atom contained in $A^1$ does not bind to any active hydrogen and, for example, may be protected with a tri-substituted hydrocarbylsilyl group or the like. Incidentally, the "active hydrogen" herein means a hydrogen atom bound to an atom other than a carbon atom, and preferably, means one having lower bond energy than that of a carbon-hydrogen bond of polymethylene.

In particular, $A^1$ is preferably a group capable of becoming an onium ion by the action of an onium salt-forming agent. When the end-modifying agent has such a group ($A^1$), excellent shape-retaining properties can be imparted to the modified conjugated diene polymer.

Specific examples of $A^1$ include a nitrogen-containing group in which two hydrogen atoms of a primary amino group are substituted with two protective groups, a nitrogen-containing group in which one hydrogen atom of a secondary amino group is substituted with one protective group, a tertiary amino group, an imino group, a pyridyl group, a phosphorus-containing group in which two hydrogen atoms of a primary phosphino group are substituted with two protective groups, a phosphorus-containing group in which one hydrogen atom of a secondary phosphino group is substituted with one protective group, a tertiary phosphino group, a sulfur-containing group in which one hydrogen atom of a thiol is substituted with one protective group, and the like. Of these, from the viewpoint of good affinity to silica, $A^1$ is preferably a group having a nitrogen atom. Incidentally, the "protective group" is a functional group that converts $A^1$ into an inactive functional group and, for example, tri-substituted hydrocarbylsilyl group and the like may be mentioned.

As specific examples of the above compound (a-1), there may be mentioned, as compounds having the nitrogen-containing group in which two hydrogen atoms of a primary amino group are substituted with two protective groups, the nitrogen-containing group in which one hydrogen atom of a secondary amino group is substituted with one protective group, or the tertiary amino group and an alkoxysilyl group, for example, N,N-bis(trimethylsilyl)aminopropyltrimethoxysilane, N,N-bis(trimethylsilyl)aminopropylmethyldiethoxysilane, N,N',N'-tris(trimethylsilyl)-N-(2-aminoethyl)-3-aminopropyltriethoxysilane, 1-(3-triethoxysilylpropyl)-2,2,5,5-tetramethyl-1-aza-2,5-disilacyclopentane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-p-phenylenediamine, 3-[3-(trimethylsilylethylamino)-1-pyrrolidinyl]-propyl-methyldiethoxysilane, N-[3-(diethoxymethylsilyl)-propyl]-N-ethyl-N'-(2-ethoxyethyl)-N'-trimethylsilyl-ethane-1,2-diamine, 3-(4-trimethylsilyl-1-piperazino)propylmethyldimethoxysilane, N-trimethylsilyl-N-methylaminopropylmethyldiethoxysilane, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 1-[3-(trimethoxysilyl)-propyl]-3-methylimidazolidine, 2-(3-trimethoxysilyl-propyl)-1,3-dimethylimidazolidine, 1-[3-(triethoxysilyl)-propyl]-3-methylhexahydropyrimidine, 3-[3-(tributoxysilyl)-propyl]-1-methyl-1,2,3,4-tetrahydropyrimidine, 1-(2-ethoxyethyl)-3-[3-(trimethoxysilyl)-propyl]-imidazolidine, 2-{3-[3-(trimethoxysilyl)-propyl]-tetrahydropyrimidine-1-yl}-ethyldimethylamine, 2-(trimethoxysilyl)-1,3-dimethylimidazolidine, 2-(triethoxysilyl)-1,4-diethylpiperazine, 5-(triethoxysilyl)-1,3-dipropylhexahydropyrimidine, 5-(diethoxyethylsilyl)-1,3-diethylhexahydropyrimidine, 2-[3-(2-dimethylaminoethyl)-2-(3-ethyldimethoxysilyl-propyl)-imidazolidine-1-yl]-ethyl-dimethylamine, 5-(3-trimethoxysilyl-propyl)-1,3-bis-(2-methoxyethyl)-hexahydropyrimidine, 3-dimethylaminopropyltrimethoxysilane, 3-dimethylaminopropylmethyldimethoxysilane, 3-morpholinopropylmethyldimethoxysilane, 3-piperidinopropyltrimethoxysilane, 3-piperidinopropylmethyldimethoxysilane, bis[3-(triethoxysilyl)propyl]trimethylsilylamine, compounds in which the alkyl group or the alkanediyl group in the above-mentioned compounds is replaced with an alkyl group having 1 to 6 carbon atoms or an alkanediyl group having 1 to 6 carbon atoms, and the like.

Of these, examples of preferable compounds include N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-trimethylsilyl-N-methylaminopropylmethyldiethoxysilane, 3-(4-trimethylsilyl-1-piperazino)propyltriethoxysilane, N-[2-(trimethoxysilyl)-ethyl]-N,N',N'-trimethylethane-1,2-diamine, 1-[3-(triethoxysilyl)-propyl]-4-methylpiperazine, 2-(trimethoxysilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, bis[3-(triethoxysilyl)propyl]trimethylsilylamine, bis[3-(trimethoxysilyl)propyl]trimethylsilylamine, and the like.

As compounds having the imino group or the pyridyl group and the alkoxysilyl group, there may be mentioned N-(1,3-dimethylbutylidene)-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, and trimethoxysilyl compounds, methyldiethoxysilyl compounds and ethyldimethoxysilyl compounds corresponding to these triethoxysilyl compounds, N-(3-trimethoxysilylpropyl)-4,5-dihydroimidazole, N-(3-triethoxysilylpropyl)-4,5-dihydraimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropylmethyldimethoxysilane, and compounds in which the alkyl group or the alkanediyl group in the above-mentioned compounds is replaced with an alkyl group having 1 to 6 carbon atoms or an alkanediyl group having 1 to 6 carbon atoms, and the like.

Of these, examples of preferable compounds include N-(1,3-dimethylbutylidene)-3-(triethoxysilyl)-1-propaneamine, N-(1-methylpropylidene)-3-(triethoxysilyl)-1-propaneamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, and the like.

As the compounds having a phosphorus-containing group in which two hydrogen atoms of a primary phosphino group are substituted with two protective groups, the phosphorus-containing group in which one hydrogen atom of a secondary phosphino group is substituted with one protective group, the tertiary phosphino group, or the sulfur-containing group in which one hydrogen atom of a thiol group is substituted with one protective group and the alkoxysilyl group, there may be mentioned P,P-bis(trimethylsilyl)phosphinopropylmethyldimethoxysilane, P,P-bis(trimethylsilyl)phosphinopropyltrimethoxysilane, 3-dimethylphosphinopropyltrimethoxysilane, 3-dimethylphosphinopropylmethyldimethoxysilane, 3-diphenylphosphinopropyltrimethoxysilane, 3-diphenylphosphinopropyltriethoxysilane, 3-diphenylphosphinopropylmeryldimethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, compounds in which the alkyl group or the alkanediyl group in the above-mentioned compounds is replaced with an alkyl group having 1 to 6 carbon atoms or an alkanediyl group having 1 to 6 carbon atoms, and the like.

Of these, examples of preferable compounds include 3-diphenylphosphinopropyltrimethoxysilane, 3-diphenylphosphinopropyltriethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, and the like.

Besides, as the end-modifying agent, there may be, for example, mentioned compounds having an iso(thio)cyanatate group, such as 3-isocyanatopropyltrimethoxysilane, 3-isocyanatopropyltriethoxysilane, and 3-isothiocyanatopropyltrimethoxysilane.

[Compound (a-2)]

The compound (a-2) has the functional group (x1) and the group (x2). Here, the cyclic ether group of the functional group (x1) is preferably a three-membered ring or a four-membered ring and more preferably the three-membered ring. Moreover, the group (x2) is preferably a group containing a nitrogen atom that does not bind to any active hydrogen and is preferably a tri-substituted nitrogen atom.

In the compound (a-2), the nitrogen atom, the phosphorus atom, the oxygen atom, and the sulfur atom contained in the group (x2) may directly bind to the functional group (x1) or may bind to the functional group (x1) via a divalent organic group. As the divalent organic group, a hydrocarbylene group having 1 to 30 carbon atoms may be, for example, mentioned.

Specific examples of the compound (a-2) include, as compounds having the cyclic ether group, for example, epoxyamine compounds such as N,N,N',N-tetraglycidyl-1,3-bisaminomethylcyclohexane, N,N,N',N'-tetraglycidyl-m-xylylenediamine, N,N,N,N'-tetraglycidyl(4,4'-methylenebisaniline), N,N,N',N'-tetraglycidyl-p-phenylenediamine, and N,N-diglycidylaminomethylcyclohexane, and the like; and as compounds having the (thio)carbonyl group, for example, (dihydrocarbylamino)benzophenones such as 4-N,N-dimethylaminobenzophenone, 4,4'-bis(dimethylamino)benzophenone, and 4,4'-bis(diethylamino)benzophenone; 4-aminoacetophenones such as 4-N,N-dimethylaminoacetophenone and α-(1H-imidazol-1-yl-acetophenone; bis(dihydrocarbylaminoalkyl)ketones such as 1,7-bis(methylethylamino)-4-heptanone; dihydrocarbylaminoalkyl (meth) acrylates such as 2-dimethylaminoethyl acrylate, 3-dimethylaminopropyl acrylate, and 2-dimethylaminoethyl methacrylate; hydrocarbylimidazolidinones such as 1,3-dimethyl-2-imidazolidinone and 1,3-diethyl-2-imidazolidinone; N-hydrocarbylpyrrolidones such as 1-phenyl-2-pyrrolidone and 1-methyl-2-pyrrolidone; N-hydrocarbylcaprolactams such as N-methyl-ε-caprolactam and N-phenyl-ε-caprolactam; N,N-dihydrocarbylformamides such as N,N-diethylformamide; N,N-dihydrocarbylacetamides such as N,N-dimethylacetamide; (meth) acrylamides such as N,N-dimethylacrylamide, N,N-dimethylmethacrylamide, N,N-dimethylaminopropylacrylamide, and N,N-diethylaminopropylacrylamide; thioketones such as 4,4'-bis(dimethylamino)thiobenzophenone and 4,4'-bis(diethylamino)thiobenzophenone; and the like.

[Compound (a-3)]

The number of the iso(thio)cyanate group contained in the compound (a-3) is sufficiently two or more and is preferably from 2 to 6 and more preferably 2 to 4. In the compound (a-3), as the structure other than the iso(thio)cyanate group, for example, a divalent hydrocarbylene group having 1 to 30 carbon atoms and the like may be mentioned.

Specific examples of the compound (a-3) include 2,4-tolylene diisocyanate, 2,6-tolylene diisocyanate, diphenylmethane diisocyanate, naphthalene diisocyanate, triphenylmethane triisocyanate, p-phenylene diisocyanate, tris (isocyanatophenyl)thiophosphate, xylene diisocyanate, benzene-1,2,4-triisocyanate, naphthalene-1,2,5,7-tetraisocyanate, 1,4-phenylene diisothiocyanate, and the like.

As the end-modifying agent, in view of strong affinity to silica, it is preferable to use at least one selected from the group consisting of the compound (a-1) and the compound (a-2), and the use of the compound (a-1) is particularly preferable. Moreover, in the case where the silane compound (a-1) is used as the end-modifying agent, for the purpose of adjusting the Mooney viscosity of the modified conjugated diene polymer, silicon tetrachloride or an epoxy-containing compound (e.g., N,N,N',N-tetraglycidyl-1,3-bisaminomethylcyclohexane or the like) may be used together with the silane compound (a-1). Incidentally, from the viewpoint that the above-exemplified end-modifying agent can afford a modified conjugated diene polymer having a modified polymerization termination end, all have similar activity. Therefore, even one not described in Examples to be described later can be used in the invention.

The end modification reaction can be performed, for example, as a solution reaction. The solution reaction may be performed with using an unreacted monomer-containing solution after completion of the polymerization reaction in the polymerization step as it is or may be performed after the conjugated diene polymer contained in the solution is isolated and dissolved in a suitable solvent such as cyclohexane. Moreover, the modification reaction may be performed either in a batch system or in a continuous system. At this time, a method of adding the end-modifying agent is not particularly limited, and there may be mentioned a method of batch addition, a method of split addition, a method of continuous addition, and the like.

The amount of the end-modifying agent to be used in the end modification reaction may be appropriately set depending on the kind of the compound to be used in the reaction but is preferably 0.1 molar equivalents or more and more preferably 0.3 molar equivalents or more, based on the active site of the conjugated diene polymer. When the amount is controlled to 0.1 molar equivalents or more, the modification reaction can be allowed to proceed sufficiently and dispersibility of silica can be suitably improved. Moreover, so as not to inhibit the reaction in the first modification step to be described later, the amount is preferably controlled to 1.2 molar equivalents or less based on the active site of the conjugated diene polymer.

The temperature of the end modification reaction is usually the same as the above-described polymerization reaction temperature, and it is preferably from −20 to 150° C., more preferably from 0 to 120° C., and particularly preferably from 20 to 100° C. When the temperature of the modification reaction is low, the viscosity of the modified conjugated diene polymer solution tends to increase. On the other hand, when the temperature of the modification reaction is high, the polymerization active end is prone to be deactivated. The reaction time of the modification reaction is preferably from 1 minute to 5 hours and more preferably from 2 minutes to 1 hour.

<First Modification Step>

The first modification reaction in the invention is a step wherein an unsaturated binding site at least either in the skeleton or at the side chain of the conjugated diene polymer obtained in the above-described polymerization reaction is reacted with a first compound having a group 4 or 13 element (hereinafter also referred to as specific element) of the periodic table. By the reaction, the specific element capable of interacting with silica is added to the unsaturated binding site at least either in the skeleton or at the side chain of the conjugated diene polymer, specifically the vinyl binding site in the constituting unit originated from the conjugated diene compound. Incidentally, the "in the skeleton" means an intermediate part between one end and another end of the polymer and a site different from any end of the main chain of the polymer.

[First Compound]

As the group 4 element contained in the first compound, titanium, zirconium, and hafnium can be exemplified. Moreover, as the group 13 element, boron, aluminum, gallium, indium, and thallium can be exemplified. As the specific element contained in the first compound, particularly, titanium, zirconium, boron, or aluminum is preferable and boron is particularly preferable in view of high reactivity with a double bond and in view of strong interaction with silica and the capability of making the hysteresis loss properties and the wet skid properties satisfactory.

In the case where the first compound has the group 4 element, the first compound is preferably a metallocene compound or an indenyl compound. Specific examples thereof include, as compound having titanium, for example, bis(cyclopentadienyl)titanium monochloride monohydride, bis(indenyl)titanium monochloride monohydride, bis(methylcyclopentadienyl)titanium monochloride monohydride, bis(ethylcyclopentadienyl)titanium monochloride monohydride, bis(indenyl)titanium monochloride monohydride, bis (cyclopentadienyl)titanium dihydride, bis(methylcyclopentadienyl)titanium dihydride, and the like;

as compound having zirconium, for example, bis(cyclopentadienyl)zirconium monochloride monohydride, bis(methylcyclopentadienyl)zirconium monochloride monohydride, bis(ethylcyclopentadienyl)zirconium monochloride monohydride, bis(indenyl)zirconium monochloride monohydride, bis(cyclopentadienyl)zirconium dihydride, bis(methylcyclopentadienyl)zirconium dihydride, and the like; and as compounds having hafnium, for example, bis(cyclopentadienyl)hafnium monochloride monohydride, bis(cyclopentadienyl)hafnium dihydride, and the like.

Moreover, in the case where the first compound has the group 13 element, the first compound is preferably a compound having a boron-hydrogen bond or a compound having an aluminum-hydrogen bond. In particular, in view of high reactivity with a double bond and in view of strong interaction with silica and the capability of making the hysteresis loss properties and wet skid properties satisfactory, the compound having a boron-hydrogen bond is particularly preferable. Incidentally, it is surmised that boron has an unoccupied orbital and the interaction between silica and a metal (boron) may strongly work due to the presence of the unoccupied orbital.

Preferable examples of such a first compound include, as the compounds having a boron-hydrogen bond, for example, alkylboranes such as 9-borabicyclo[3.3.1]nonane, disiamylborane, thexylborane, and diisopinocampheylborane; alkoxyboranes such as pinacolborane and catecholborane; halides such as H—$BX_2$ wherein X is a hydrogen atom, a chlorine atom, or a bromine atom and at least one is a chlorine atom or a bromine atom; monoborane, diborane, and the like; and as compounds having an aluminum-hydrogen bond, for example, aluminum lithium hydride, diethylaluminum hydride, di-n-propylaluminum hydride, diisopropylaluminum hydride, diisobutylaluminum hydride, and the like.

The reaction of the conjugated diene polymer with the first compound can be performed as a solution reaction. The solution reaction may be performed with using a reaction solution as it is after the polymerization reaction is finished by adding a polymerization terminator such as an alcohol or an end-modifying agent or may be performed after the polymer contained in the solution is isolated and dissolved in a suitable solvent such as cyclohexane. Moreover, the reaction may be performed either in a batch system or in a continuous system. At this time, a method of adding the first compound is not particularly limited, and there may be mentioned a method of batch addition, a method of split addition, a method of continuous addition, and the like. Incidentally, with regard to the conjugated diene polymer to be used in the reaction with the first compound, at least either of the polymerization initiation end and the polymerization termination end may be modified with a modifying agent (compound (R), end-modifying agent) or both of the polymerization initiation end and the polymerization termination end may not be modified.

The amount of the first compound to be used in the reaction is not particularly limited but is preferably a ratio so as to be from 0.1 to 20 molar equivalents and more preferably a ratio so as to be from 1 to 10 molar equivalents, based on one equivalent of the polymer. The reaction temperature is usually the same as the above-described polymerization temperature, and it is preferably from −20 to 150° C., more preferably from 0 to 120° C., and particularly preferably from 20 to 100° C. The reaction time is preferably from 1 minute to 3 hours and more preferably from 2 minutes to 1 hour. By the modification reaction, it is possible to obtain the modified conjugated diene polymer of the invention in which the specific atom is added to the unsaturated binding site present at least either in the skeleton or at the side chain of the conjugated diene polymer.

<Second Modification Step>

The production method of the invention may further comprises a step (second modification step) wherein a reactive site of the conjugated diene polymer after modification with the first compound is reacted with a second compound having a functional group that interacts with silica. By the step, a functional group that interacts with silica can be introduced into at least either in the skeleton or at the side chain of the conjugated diene polymer.

[Second Compound]

The second compound is not particularly limited as long as it is a compound having a functional group that interacts with silica and capable of reacting with the reactive site of the conjugated diene polymer formed by the first modification step. Preferable examples of the second compound include compounds having at least one atom selected from the group consisting of a nitrogen atom, an oxygen atom, a silicon atom, a phosphorus atom, and a sulfur atom and having an active hydrogen. In particular, the compound is preferably a compound having at least any of a nitrogen atom, an oxygen atom, and a silicon atom.

The second compound may be either a low-molecular-weight compound or a high-molecular-weight compound (polymer). In the case where the second compound is a low-molecular-weight compound, preferable examples thereof include compounds having an alkoxysilyl group, compound having two or more nitrogen atoms, polyhydric alcohols, polybasic carboxylic acids, amino acid compounds, and the like.

Specific examples thereof include, as the alkoxysilyl group-containing compounds, for example, 3-aminopropyltrimethoxysilane, 3-aminopropyltriethoxysilane, 3-aminopropylmethyldimethoxysilane, 3-aminopropylethyldimethoxysilane, 3-aminopropyldimethylmethoxysilane, 3-aminopropyldimethylethoxysilane, 3-aminopropylmethyldiethoxysilane, 3-aminopropyldimethylbutoxysilane, 3-aminopropylmethyldibutoxysilane, 3-(2-aminoethylamino)propyltrimethoxysilane, N-[2-[3-(trimethoxysilyl)propylamino]ethyl]ethylenediamine, N-[2-[3-(triethoxysilyl)propylamino]ethyl]ethylenediamine, and the like;

as the compounds having two or more nitrogen atoms, for example, ethylenediamine, tetramethylenediamine, hexamethylenediamine, N,N,N,N'-tetrakis(2-hydroxypropyl)ethylenediamine, 4,4'-diaminodiphenyl ether, and the like;

as the polyhydric alcohols, ethylene glycol, propylene glycol, diethylene glycol, trimethylolpropane, pentaerythritol, and the like:

as the polybasic carboxylic acids, oxalic acid, malonic acid, phthalic acid, 1,2,3,4-butanetetracarboxylic acid, and the like; and as the amino acid compounds, alanine, arginine, aspartic acid, histidine, glutamic acid, thyrosine, cysteine, and the like.

Moreover, in the case where the second compound is a high-molecular-weight compound, preferable examples thereof include compounds having a polysiloxane structure, compounds having a polyether structure, compounds having a polyimine structure, and the like. By performing a modification treatment with such a high-molecular-weight compound, an effect as a compatibilizing agent can be imparted to the conjugated diene polymer.

Specific examples of the high-molecular-weight compound that is a second compound include, as the compounds having a polysiloxane structure, for example, amino group-containing polysiloxanes such as KF-859, KF-393, KF-860, KF-880, KF-8004, KF-8002, KF-8005, KF-867, X-22-3820W, KF-869, KF861, KF-868, KF-865, KF-864, X-22-3939A, PAM-E, KF-8010, X22-161A, X-22-161B, KF8012, KF-8008, KF-857, KF-8001, KF-862, and X-22-9192 (all the above, manufactured by Shin-Etsu Chemical Company, Ltd.); hydroxyl group-containing polysiloxanes such as X-22-160AS, KF-6001, KF-6002, KF-6003, X-21-5841, KF-9701, X22-1821, X-22-170BX, X-22-170DX, X-22-176DX, and X-22-176F (all the above, manufactured by Shin-Etsu Chemical Company, Ltd.); and the like;

as the compounds having a polyether structure, for example, hydroxyl group-containing polyether compounds such as MPG-130 (manufactured by Nippon Nyukazai Co., Ltd.), SR-8EG, SR-TPG SR-4PG (all the above, manufactured by Sakamoto Yakuhin Kogyo Co., Ltd.), and the like; and as the compounds having a polyimine structure, for example, amino group-containing polyimines such as EPOMIN SP-003, EPOMIN SP-006, EPOMIN SP-012, and EPOMIN SP-018 (all the above, manufactured by Nippon Shokubai Co., Ltd.), Lupasol series (manufactured by BASF), and the like. Incidentally, as the second compound, the above-described ones may be used either alone or as a combination of two or more thereof.

Incidentally, from the viewpoint that the above-exemplified first and second compounds can afford modified conjugated diene polymers in which the main chain or side chain of the polymers has been modified, all have similar activity. Therefore, even one not described in Examples to be described later can be used in the invention.

The reaction of the conjugated diene polymer after the modification with the first compound with the second compound can be performed as a solution reaction. The solution reaction may be performed with using a reaction solution as it is after the modification reaction by the above first modification step or may be performed after the polymer contained in the solution is isolated and dissolved in a suitable solvent such as cyclohexane. Moreover, the reaction may be performed either in a batch system or in a continuous system. At this time, a method of adding the second compound is not particularly limited, and there may be mentioned a method of batch addition, a method of split addition, a method of continuous addition, and the like.

The ratio of the second compound to be used in the reaction is a ratio so that the functional group site of the second compound is preferably from 0.1 to 20 molar equivalents and more preferably from 1 to 10 molar equivalents, based on one equivalent of the polymer. The reaction temperature is usually the same as the above-described polymerization temperature, and it is preferably from −20 to 150° C., more preferably from 0 to 120° C., and particularly preferably from 20 to 100° C. The reaction time is preferably from 1 minute to 5 hours and more preferably from 2 minutes to 1 hour.

As above, the conjugated diene polymer after modification with the first compound (modified conjugated diene polymer) is reacted with the second compound. By the reaction, there can be obtained the modified conjugated diene polymer in which at least either of the main chain and the side chain of the polymer is modified with the second compound through binding the specific element contained in the polymer to the functional group part (amino group or hydroxyl group) of the second compound.

[Other Steps]

In the case where the end modification of the conjugated diene polymer is performed using the end-modifying agent, the production method of the invention may include, after completion of the modification reaction by the first modification step or the second modification step, a step of mixing the modified conjugated diene polymer and an onium salt-forming agent. By the step, shape-retaining properties of the modified conjugated diene polymer can be enhanced through the introduction of an onium structure into the conjugated diene polymer.

Examples of the onium salt-forming agent to be used in the above step include halogenated metal compounds such as halogenated silicon compounds, halogenated tin compounds, halogenated aluminum compounds, halogenated titanium compounds, halogenated zirconium compounds, halogenated germanium compounds, halogenated gallium compounds, and halogenated zinc compounds; inorganic acid esters such as sulfuric acid esters, phosphoric acid esters, carbonic acid esters, and nitric acid esters; inorganic acids such as hydrofluoric acid, hydrochloric acid, hydrobromic acid, hydroiodic acid, sulfuric acid, nitric acid, carbonic acid, and phosphoric acid; inorganic acid salts such as potassium fluoride, tetramethylammonium fluoride, and tetra-n-butylammonium fluoride; organic acids such as carboxylic acids (e.g., maleic acid) and sulfonic acids; and the like. Preferable specific examples of the onium salt-forming agent include silicon tetrachloride, tin tetrachloride, trimethylsilyl chloride, dimethyldichlorosilane, diethylaluminum chloride, zinc chloride, titanium tetrachloride, zirconium tetrachloride, germanium tetrachloride, gallium trichloride, diethyl sulfate, trimethyl phosphate, dimethyl carbonate, maleic acid, benzenesulfonic acid, and the like.

The treatment of mixing the conjugated diene polymer and the onium salt-forming agent can be performed, for example, in a solution. With regard to the ratio of the conjugated diene polymer to the onium salt-forming agent to be used in the treatment, the amount of the onium salt-forming agent is preferably 0.5 molar equivalents or more and more preferably 1.0 molar equivalent or more, based on the active site of the conjugated diene polymer.

The temperature at the time when the conjugated diene polymer and the onium salt-forming agent are mixed is usually the same as the polymerization temperature of the conjugated diene polymer, and it is preferably from −20 to 150° C., more preferably from 0 to 120° C., and particularly preferably from 20 to 100° C.

The formation of the onium structure in the conjugated diene polymer is performed in the presence of water. Specifically, there may be, for example, mentioned (i) a method of directly adding water and the onium salt-forming agent into a solution containing the conjugated diene polymer, followed by mixing, (ii) a method of adding one obtained by dissolving water in an organic solvent (e.g., an alcohol) soluble in water and the onium salt-forming agent, to a solution containing the conjugated diene polymer, followed by mixing, and (iii) a method of allowing water to exist in the system with utilizing solvent removal by steam stripping after a solution containing the conjugated diene polymer and the onium salt-forming agent are mixed, and a similar method. Preferred is a method of (iii).

In order to isolate the modified conjugated diene polymer contained in the reaction solution, the isolation can be performed, for example, by a known solvent removal method such as steam stripping and a drying operation such as a heat treatment. With regard to the modified conjugated diene polymer thus obtained, the Mooney viscosity may be adjusted by adding an extender oil or the like, as needed. By the treatment, workability can be improved. As the extender oil, there may be, for example, mentioned aroma oils, naphthenic oils, paraffin oils, and the like. The amount of the extender oil to be blended may be appropriately set depending on the monomer or the like to be used in the polymerization but is, for example, from 10 to 50 parts by mass based on 100 parts by mass of the modified conjugated diene polymer.

[2] Polymer Composition (Polymer Components)

The polymer composition of the invention contains the modified conjugated diene polymer (hereinafter also referred to as specific polymer) obtained by the production method of the invention as a polymer component.

The content ratio of the polymer component in the polymer composition is preferably 20% by mass or more, more preferably 30% by mass or more, and particularly preferably 40% by mass or more based on the total amount of the polymer composition. When the ratio is 20% by mass or more, mechanical properties such as tensile strength and tensile elongation, crack growth resistance, and wear resistance of the crosslinked polymer can be made more satisfactory.

The polymer composition of the invention may contain, as a polymer component, another polymer component other than the above-described specific polymer. As the other polymer component, there may be, for example, mentioned natural rubber, synthetic isoprene rubber, butadiene rubber, modified butadiene rubber, styrene-butadiene rubber, modified styrene-butadiene rubber, ethylene-α-olefin copolymerized rubber, ethylene-α-olefin-diene copolymerized rubber, acrylonitrile-butadiene copolymerized rubber, chloroprene rubber, halogenated butyl rubber, styrene-isoprene copolymerized rubber, butadiene-isoprene copolymer rubber, random styrene-butadiene-isoprene copolymerized rubber, styrene-acrylonitrile-butadiene copolymerized rubber, acrylonitrile-butadiene copolymerized rubber, and polystyrene-polybutadiene-polystyrene block copolymers, and mixtures thereof and the like.

In the case where the above other polymer is contained as a polymer component, the content ratio of the specific polymer is preferably 5% by mass or more, more preferably 10% by mass or more, and particularly preferably 20% by mass or more based on the whole of the polymer components contained in the polymer composition. When the ratio is 5% by mass or more, various properties such as low hysteresis loss properties, wear resistance, and workability can be made more satisfactory.

(Reinforcing Agent)

The polymer composition of the invention contains silica as a reinforcing agent. Specific examples of the silica include wet silica (hydrated silicic acid), dry silica (silicic acid anhydride), colloidal silica, precipitated silica, calcium silicate, aluminum silicate, and the like. Of these, wet silica is particularly preferable in view of an effect of improving fracture resistance and an effect of achieving both of wet grip properties and low rolling resistance. Furthermore, the use of high dispersible type silica is also preferable from the viewpoint of achieving satisfactory dispersibility in the polymer composition and improving physical properties and workability. The silicas may be used either alone or as a combination of two or more thereof.

The polymer composition of the invention may contain, as a reinforcing agent, carbon black as needed, together with silica.

Specific examples of the carbon black include respective grades of carbon black such as furnace black represented by SRF, GPF, FEF, HAF, ISAF, SAF, ISAF-HS, ISAF-LS, IISAF-HS, HAF-HS and HAF-LS, acetylene black, thermal black, channel black, graphite, and also graphite fiber and fullerene. Of these, carbon black having an iodine adsorption amount (IA) of 60 mg/g or more and a dibutyl phthalate oil absorption amount (DBP) of 80 mU100 g or more is preferable. When carbon black is used, an effect of improving grip performance and fracture resistance of the crosslinked polymer is enhanced. Furthermore, from the viewpoint of improving wear resistance of the crosslinked polymer, HAF, ISAF and SAF are particularly preferable among the above. Incidentally, the carbon blacks may be used either alone or as a combination of two or more thereof.

The total amount of the silica and the carbon black in the polymer composition of the invention is preferably from 20 to 130 parts by mass and more preferably from 25 to 110 parts by mass based on 100 parts by mass of the total of the polymer components contained in the polymer composition. The reasons are as follows: when the amount of the reinforcing agent is small, the effect of improving the fracture resistance and the like tends to become insufficient, while when the amount of the reinforcing agent is large, workability of the polymer composition tends to decrease. Furthermore, by blending a carbon-silica dual phase filler into the polymer composition of the invention, an excellent advantage similar to that in the case where carbon black and silica are used in combination can be obtained. The carbon-silica dual phase filler is a so-called silica-coating-carbon black in which silica is chemically bound to the surface of carbon black, and is marketed by Cabot Corporation with the trade names of CRX2000, CRX2002, and CRX2006. The amount of the carbon-silica dual phase filler to be blended is preferably from 1 to 100 parts by mass and more preferably from 5 to 95 parts by mass based on 100 parts by mass of the total of the polymer components.

(Silane Coupling Agent)

In the case where silica is contained as a reinforcing agent in the polymer composition of the invention, it is preferable to blend a silane coupling agent in order to further improve the reinforcing effect. Examples of the silane coupling agents include bis(3-triethoxysilylpropyl)tetrasulfide, bis(3-triethoxysilylpropyl)trisulfide, bis-(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, mercaptosilane compounds exemplified in JP-A-2006-249069, and the like.

Examples of commercially available products include trade names "NXT Silane", "NXT Z Silane", "NXT-Low-V Silane" and "NXT Ultra Low-V Silane" manufactured by Momentive Performance Materials Inc., a trade name "VP Si363" manufactured by Degussa AG, a trade name "11-MERCAPTOUNDECYLTRIMETHOXYSILANE" manufactured by Gelest, Inc., and the like.

Of these, in view of an effect of improving reinforcing properties and the like, bis(3-triethoxysilylpropyl)polysulfide, 3-trimethoxysilyl-propylbenzothiazyl tetrasulfide, and the mercaptosilane compounds exemplified in JP-A-2006-249069 are preferable. Incidentally, these silane coupling agents may be used either alone or as a combination of two or more thereof.

The amount of the silane coupling agent to be blended is preferably from 1 to 20 parts by mass and more preferably from 3 to 15 parts by mass based on 100 parts by mass of the silica contained in the polymer composition, although it varies depending on the kind and the like of the silane coupling agent. When the amount of the silane coupling agent to be directed is less than 1 part by mass, there is a tendency that the effect as the silane coupling agent is difficult to obtain sufficiently. When the amount exceeds 20 parts by mass, the polymer components tend to gel easily.

(Compatibilizing Agent)

In the preparation of the polymer composition of the invention, a compatibilizing agent can be added at the time of kneading for the purpose of improving workability in kneading or further improving a balance among wet skid resistance, low hysteresis loss properties, and wear resistance. Preferable examples of the compatibilizing agent include organic compounds selected from epoxy group-containing compounds, carboxylic acid compounds, carboxylic acid ester compounds, ketone compounds, ether compounds, aldehyde compounds, hydroxyl group-containing compounds and amino group-containing compounds, and silicon compounds selected from alkoxysilane compounds, siloxane compounds and aminosilane compounds.

Among the compatibilizing agents, specific examples of the organic compounds include, as the epoxy group-containing compounds, for example, butyl glycidyl ether, diglycidyl ether, propylene oxide, neopentyl glycol diglycidyl ether, epoxy resins, epoxidized soybean oils, epoxidized fatty acid esters, and the like; as the carboxylic acid compounds, for example, adipic acid, octylic acid, methacrylic acid, and the like; as the carboxylic acid ester compounds, for example, acrylic acid esters, diethylene acrylate, ethyl methacrylate, orthoacetic acid esters, ethyl acetoacetate, butyl acetate, isopropyl acetate, dimethyl carbonate, p-hydroxyphenyl acetate, polyester-based plasticizers, stearic acid-based plasticizers, and the like; as the ketone compounds, for example, methylcyclohexanone, acetylacetone, and the like; as the ether compounds, for example, isopropyl ether, dibutyl ether, and the like; as the aldehyde compounds, for example, undecylene aldehyde, decyl aldehyde, vanillin, 3,4-dimethoxybenzaldehyde, cuminaldehyde, and the like; as amino group-containing compounds, for example, isopropylamine, diisopropylamine, triethylamine, 3-ethoxypropylamine, 2-ethylhexylamine, isopropanolamine, N-ethylethylenediamine, ethyleneimine, hexamethylenediamine, 3-lauryloxypropylamine, aminophenol, aniline, 3-isopropoxyaniline, phenylenediamine, aminopyridine, N-methyldiethanolamine, N-methylethanolamine, 3-amino-1-propanol, ethylamine hydrochloride, n-butylamine hydrochloride, and the like; as the hydroxyl group-containing compounds, for example, isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, triethylene glycol, and the like. Of these, the epoxy group-containing compounds, the amino group-containing compounds, and the hydroxyl group-containing compounds are preferable.

Moreover, specific examples of the silicon compounds include, as the alkoxysilane compounds, for example, trimethylmethoxysilane, trimethylethoxysilane, dimethyldimethoxysilane, methyltriethoxysilane, methyltriphenoxysilane, tetraethoxysilane, methyldiethoxysilane, vinyltrimethoxysilane, and the like; as the siloxane compounds, for example, dimethylsiloxane oligomers, silicone oils, amino-modified silicone oils, epoxy-modified silicone oils, carboxyl-modified silicone oils, polyether-modified silicone oils, alkyl-modified silicone oils, higher fatty acid ester-modified silicone oils, higher alkoxy-modified silicone oils, higher fatty acid-containing silicone oils, and the like; and as the aminosilane compounds, for example, hexamethyldisilazane, nonamethyltrisilazane, anilitrimethylsilane, bis(dimethylamino)dimethylsilane, bis(diethylamino)dimethylsilane, triethylaminosilane, and the like. Of these, silazane compounds and bis(dimethylamino)dimethylsilane are preferable.

(Vulcanizing Agent)

The polymer composition of the invention contains a vulcanizing agent (crosslinking agent). As the vulcanizing agents, sulfur, sulfur halides, organic peroxides, quinone dioximes, organic polyvalent amine compounds, methylol group-containing alkylphenol resins and the like are mentioned. As the vulcanizing agent, sulfur is usually used. The amount of sulfur to be blended is preferably from 0.1 to 5 parts by mass and more preferably from 0.5 to 3 parts by mass based on 100 parts by mass of the total of the polymer components contained in the polymer composition.

The polymer composition of the invention may contain various chemicals, additives, and the like which are commonly used in the rubber industry, as desired. Examples of such chemicals or additives include vulcanizing aids, processing aids, vulcanizing accelerators, process oils, anti-aging agents, anti-scorching agents, zinc white, stearic acid, and the like.

Here, as the vulcanizing aid and the processing aid, stearic acid is usually used. The amount of the vulcanizing aid and the processing aid to be blended is usually from 0.5 to 5 parts by mass based on 100 parts by mass of the total of the polymer components contained in the polymer composition.

Although the vulcanizing accelerator is not particularly limited, examples thereof include sulfenamide-based, guanidine-based, thiuram-based, thiourea-based, thiazole-based, dithiocarbamic acid-based, and xanthogenic acid-based compounds, and preferably include 2-mercaptobenzothiazole, dibenzothiazyl disulfide, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, diphenylguanidine, diorthotolylguanidine, orthotolylbisguanidine, and the like. The amount of the vulcanizing accelerator to be blended is usually from 0.1 to 5 parts by mass and preferably from 0.4 to 4 parts by mass based on 100 parts by mass of the total of the polymer components contained in the polymer composition.

The polymer composition of the invention can be produced by kneading the polymer components, silica and the crosslinking agent and also components to be blended as needed with using a kneader such as an open type kneader (e.g., a roll) or a closed type kneader (e.g., a Banbury mixer). Furthermore, the polymer composition of the invention is applicable as a crosslinked polymer to various rubber products by performing crosslinking (vulcanization) after molding. For example, the polymer composition is applicable to uses in tires such as tire treads, under treads, carcasses, side walls, and bead portions; and uses in rubber cushions, fenders, belts, hoses, other industrial products, and the like. Of these, the polymer composition can be suitably used, particularly as a rubber for tire treads, from the viewpoint of providing low fuel consumption performance.

EXAMPLES

The present invention will be specifically described below on the basis of Examples but the invention is not construed as being limited to these Examples. Incidentally, "parts" and "%" in Examples and Comparative Examples are by mass basis unless otherwise specified. Measuring methods of various physical property values of the modified conjugated diene polymers are as follows.

Bound styrene content [%]: it was determined by $^1$H-NMR of 500 MHz.
Vinyl content [%]: it was determined by $^1$H-NMR of 500 MHz before modification.
Weight-average molecular weight before modification: it was determined in terms of polystyrene from the retention time corresponding to the maximum peak height of a GPC curve obtained using gel permeation chromatography (trade name "HLC-8120GPC" manufactured by Tosoh Corporation).
Column: trade name "GMHXL" (manufactured by Tosoh Corporation), 2 columns
Column temperature: 40° C.
Mobile phase: tetrahydrofuran
Flow rate: 1.0 ml/minute
Sample concentration: 10 mg/20 ml Example 1A Synthesis of Modified Conjugated Diene Polymer A1

In an autoclave reactor having an internal volume of 5 liters in which the atmosphere was replaced with nitrogen, 2,500 g of cyclohexane as a solvent, 2.45 mmol of 2,2-di (2-tetrahydrofuryl)propane (compound A) as a vinyl content adjuster, 125 g of styrene and 365 g of 1,3-butadiene as monomers were charged. After adjusting the temperature of contents in the reactor to 10° C., 5.20 mmol of n-butyllithium was added as a polymerization initiator thereto to initiate polymerization. The polymerization was conducted under adiabatic conditions, and the maximum temperature reached 85° C. At the time when the polymerization conversion reached 99% (after an elapse of time of 22 minutes from the initiation of the polymerization), 10 g of 1,3-butadiene was further added over a period of 2 minutes, and the polymerization was further conducted for 3 minutes. Then, 5.20 mmol of isopropanol as a polymerization terminator was added thereto to terminate the reaction. Thereafter, 13.4 mmol of pinacolborane (compound F) was added as a first compound (modifying agent 1) thereto, and a reaction was performed for 15 minutes.

To the resulting polymer solution, 2.0 g of 2,6-di-tert-butyl-p-cresol was added. Then, solvent removal was conducted by performing steam striping with using hot water adjusted to pH 9 with sodium hydroxide, thereby obtaining a modified conjugated diene polymer. Thereafter, the resulting polymer was dried by means of a hot roll adjusted to a temperature of 110° C. to obtain a modified conjugated diene polymer A1.

Examples 2A to 5A

Synthesis of Modified Conjugated Diene Polymers A2 to A5

Modified conjugated diene polymers A2 to A5 were obtained in the same manner as in Example 1A with the exception that, as the first compound to be used, the compound F was changed to the compounds G to J as shown in the following Table 1.

Example 6A

Synthesis of Modified Conjugated Diene Polymer A6

A modified conjugated diene polymer A6 was obtained in the same manner as in Example 1A with the exception that 4.20 mmol of piperidine was further charged into the autoclave reactor before the initiation of polymerization.

Example 7A

Synthesis of Modified Conjugated Diene Polymer A7

A polymerization reaction was performed in the same manner as in the above Example 1A, and then 5.20 mmol of isopropanol as a polymerization terminator was added to terminate the reaction. Thereafter, 13.4 mmol of the compound F was added as a first compound thereto, and a reaction was performed for 15 minutes. Then, to the resulting polymer solution, 13.4 mmol of N-[2-[3-(trimethoxysilyl)propylamino]ethyl]ethylenediamine (compound K) was added as a second compound (modifying agent 2) thereto, and a reaction was performed for 15 minutes.

To the resulting polymer solution, 2.0 g of 2,6-di-tert-butyl-p-cresol was added. Then, solvent removal was conducted by performing steam striping with using hot water adjusted to pH 9 with sodium hydroxide, thereby obtaining a modified conjugated diene polymer. Thereafter, the resulting polymer was dried by means of a hot roll adjusted to a temperature of 110° C. to obtain a modified conjugated diene polymer A7.

Example 8A

Synthesis of Modified Conjugated Diene Polymer A8

A modified conjugated diene polymer A8 was obtained in the same manner as in Example 7A with the exception that the amounts of the compound F and the compound K to be used were changed as described in the following Table 1.

Example 9A

Synthesis of Modified Conjugated Diene Polymer A9

A modified conjugated diene polymer A9 was obtained in the same manner as in Example 7A with the exception that, as a second compound to be used, the compound K was changed to the compound L as shown in the following Table 1.

Examples 10A and 11A

Synthesis of Modified Conjugated Diene Polymers A10 and A11

Modified conjugated diene polymers A10 and A11 were obtained in the same manner as in Example 7A with the exception that, as second compounds to be used, the compound K was changed to 5.0 g of the compound M or 5.0 g of the compound N as shown in the following Tables 1 and 2.

Example 12A

Synthesis of Modified Conjugated Diene Polymer A12

Polymerization was initiated in the same manner as in the above Example 1A, and after 1,3-butadiene was further added, 4.46 mmol of N,N-bis(trimethylsilyl)aminopropylmethyldiethoxysilane (compound C) was added as an end-modifying agent in stead of isopropanol, and a reaction was performed for 15 minutes. Then, 13.4 mmol of the compound F was added as a first compound thereto, and a reaction was performed for 15 minutes. To the resulting polymer solution, 13.4 mmol of the compound K was added as a second compound thereto, and a reaction was further performed for 15 minutes. To the resulting polymer solution, 2.0 g of 2,6-di-tert-butyl-p-cresol was added. Then, solvent removal was conducted by performing steam striping with using hot water adjusted to pH 9 with sodium hydroxide, thereby obtaining a modified conjugated diene polymer. Thereafter, the resulting polymer was dried by means of a hot roll adjusted to a temperature of 110° C. to obtain a modified conjugated diene polymer A12.

Examples 13A and 14A

Synthesis of Modified Conjugated Diene Polymers A13 and A14

Modified conjugated diene polymers A13 and A14 were obtained in the same manner as in Example 12A with the exception that, as an end-modifying agent to be used, the compound C was changed to the compound D or the compound E as shown in the following Table 2.

Example 15A

Synthesis of Modified Conjugated Diene Polymer A15

A modified conjugated diene polymer A15 was obtained in the same manner as in Example 12A with the exception that, in the above Example 12A, 0.56 mmol of silicon tetrachloride was added as an end-modifying agent and a reaction was performed for 5 minutes, instead of the operation that 4.46 mmol of the compound C was added as an end-modifying agent and a reaction was performed for 15 minutes, and then 2.23 mmol of the compound C was added as an end-modifying agent and a reaction was performed for 15 minutes.

Example 16A

Synthesis of Modified Conjugated Diene Polymer A16

A modified conjugated diene polymers A16 was obtained in the same manner as in Example 12A with the exception that, as a second compound to be used, the compound K was changed to 5.0 g of the compound M as shown in the following Table 2.

Example 17A

Synthesis of Modified Conjugated Diene Polymer A17

A modified conjugated diene polymers A17 was obtained in the same manner as in Example 15A with the exception that, as a second compound to be used, the compound K was changed to 5.0 g of the compound M as shown in the following Table 2.

Example 18A

Synthesis of Modified Conjugated Diene Polymer A18

A modified conjugated diene polymer A18 was obtained in the same manner as in Example 12A with the exception that 4.20 mmol of piperidine was further charged into the autoclave reactor before the initiation of polymerization.

Example 19A

Synthesis of Modified Conjugated Diene Polymer A19

A modified conjugated diene polymer A19 was obtained in the same manner as in Example 18A with the exception that the piperidine to be used was changed to N-(tert-butyldimethylsilyl)piperazine (compound B).

Example 20A

Synthesis of Modified Conjugated Diene Polymer A20

A modified conjugated diene polymers A20 was obtained in the same manner as in Example 18A with the exception that, as a second compound to be used, the compound K was changed to 5.0 g of the compound M as shown in the following Table 2.

Example 21A

Synthesis of Modified Conjugated Diene Polymer A21

A modified conjugated diene polymer A21 was obtained in the same manner as in Example 19A with the exception that, in the above Example 19A, after the second compound was added and a reaction was performed for 15 minutes, 16.8 mmol of silicon tetrachloride was further added as an onium salt-forming agent.

Example 22A

Synthesis of Modified Conjugated Diene Polymer A22

A modified conjugated diene polymers A22 was obtained in the same manner as in Example 20A with the exception that, as an onium salt-forming agent, silicon tetrachloride was changed to 13.6 mmol of maleic acid as shown in the following Table 3.

Comparative Synthetic Example 1

Synthesis of Conjugated Diene Polymer B1

In an autoclave reactor having an internal volume of 5 liters in which the atmosphere was replaced with nitrogen, 2,500 g of cyclohexane as a solvent, 2.45 mmol of the compound A as a vinyl content adjuster, 125 g of styrene and 365 g of 1,3-butadiene as monomers were charged. After adjusting the temperature of contents in the reactor to 10° C., 5.20 mmol of n-butyllithium was added as a polymerization initiator thereto to initiate polymerization. The polymerization was conducted under adiabatic conditions, and the maximum temperature reached 85° C. At the time when the polymerization conversion reached 99% (after an elapse of time of 22 minutes from the initiation of the polymerization), 10 g of 1,3-butadiene was further added over a period of 2 minutes, and the polymerization was further conducted for 3 minutes. Then, 5.20 mmol of isopropanol as a polymerization terminator was added thereto to terminate the reaction.

To the resulting polymer solution, 2.0 g of 2,6-di-tert-butyl-p-cresol was added. Then, solvent removal was conducted by performing steam striping with using hot water adjusted to pH 9 with sodium hydroxide, thereby obtaining a modified conjugated diene polymer. Thereafter, the resulting polymer was dried by means of a hot roll adjusted to a temperature of 110° C. to obtain a conjugated diene polymer B1.

Comparative Synthetic Example 2

Synthesis of Modified Conjugated Diene Polymer B2

A modified conjugated diene polymer B2 was obtained by performing the same operation as in Comparative Synthetic Example 1 with the exception that 4.20 mmol of piperidine was further charged into the autoclave reactor before the initiation of polymerization.

Comparative Example 3

Synthesis of Modified Conjugated Diene Polymer B3

Polymerization was initiated in the same manner as in the above Comparative Synthetic Example 1, and after 1,3-butadiene was further added, 4.46 mmol of the compound C was added as an end-modifying agent in stead of isopropanol, and a reaction was performed for 15 minutes. To the resulting polymer solution, 2.0 g of 2,6-di-tert-butyl-p-cresol was added. Then, solvent removal was conducted by performing steam striping with using hot water adjusted to pH 9 with sodium hydroxide, thereby obtaining a modified conjugated diene polymer. Thereafter, the resulting polymer was dried by means of a hot roll adjusted to a temperature of 110° C. to obtain a modified conjugated diene polymer B3.

Comparative Synthetic Example 4

Synthesis of Modified Conjugated Diene Polymer B4

A modified conjugated diene polymer B4 was obtained in the same manner as in Comparative Synthetic Example 3 with the exception that, in the above Comparative Synthetic Example 3, 0.56 mmol of silicon tetrachloride was added as an end-modifying agent and a reaction was performed for 5 minutes, instead of the operation that 4.46 mmol of the compound C was added as an end-modifying agent and a reaction was performed for 15 minutes, and then 2.23 mmol of the compound C was added as an end-modifying agent and a reaction was performed for 15 minutes.

Comparative Synthetic Example 5

Synthesis of Modified Conjugated Diene Polymer B5

A modified conjugated diene polymer B5 was obtained in the same manner as in Comparative Synthetic Example 3 with the exception that 4.20 mmol of piperidine was further charged into the autoclave reactor before the initiation of polymerization.

The above polymerization formulas are shown in Tables 1 to 3 together with the measurement results of various physical property values of the resulting polymers.

TABLE 1

|  |  |  | Example 1A | Example 2A | Example 3A | Example 4A | Example 5A | Example 6A | Example 7A | Example 8A | Example 9A | Example 10A |
|---|---|---|---|---|---|---|---|---|---|---|---|---|
| Kind of (modified) conjugated diene polymer | | | A1 | A2 | A3 | A4 | A5 | A6 | A7 | A8 | A9 | A10 |
| Polymerization formula | Solvent | | | | | | | | | | | |
| | cyclohexane | (g) | 2500 | 2500 | 2500 | 2500 | 2500 | 2500 | 2500 | 2500 | 2500 | 2500 |
| | Vinyl content adjuster | | | | | | | | | | | |
| | compound A | (mmol) | 2.45 | 2.45 | 2.45 | 2.45 | 2.45 | 2.45 | 2.45 | 2.45 | 2.45 | 2.45 |

TABLE 1-continued

|  |  |  | Example 1A | Example 2A | Example 3A | Example 4A | Example 5A | Example 6A | Example 7A | Example 8A | Example 9A | Example 10A |
|---|---|---|---|---|---|---|---|---|---|---|---|---|
|  | Polymerizing monomer |  |  |  |  |  |  |  |  |  |  |  |
|  | styrene | (g) | 125 | 125 | 125 | 125 | 125 | 125 | 125 | 125 | 125 | 125 |
|  | 1,3-butadiene | (g) | 365 | 365 | 365 | 365 | 365 | 365 | 365 | 365 | 365 | 365 |
|  | further added butadiene | (g) | 10 | 10 | 10 | 10 | 10 | 10 | 10 | 10 | 10 | 10 |
|  | Polymerization initiator |  |  |  |  |  |  |  |  |  |  |  |
|  | n-butyllithium | (mmol) | 5.20 | 5.20 | 5.20 | 5.20 | 5.20 | 5.20 | 5.20 | 5.20 | 5.20 | 5.20 |
|  | piperidine | (mmol) | — | — | — | — | — | 4.20 | — | — | — | — |
|  | compound B | (mmol) | — | — | — | — | — | — | — | — | — | — |
|  | End-modifying agent |  |  |  |  |  |  |  |  |  |  |  |
|  | compound C | (mmol) | — | — | — | — | — | — | — | — | — | — |
|  | compound D | (mmol) | — | — | — | — | — | — | — | — | — | — |
|  | compound E | (mmol) | — | — | — | — | — | — | — | — | — | — |
|  | silicon tetrachloride | (mmol) | — | — | — | — | — | — | — | — | — | — |
|  | Modifying agent 1 |  |  |  |  |  |  |  |  |  |  |  |
|  | compound F | (mmol) | 13.4 | — | — | — | — | 13.4 | 13.4 | 26.8 | 13.4 | 13.4 |
|  | compound G | (mmol) | — | 13.4 | — | — | — | — | — | — | — | — |
|  | compound H | (mmol) | — | — | 13.4 | — | — | — | — | — | — | — |
|  | compound I | (mmol) | — | — | — | 13.4 | — | — | — | — | — | — |
|  | compound J | (mmol) | — | — | — | — | 13.4 | — | — | — | — | — |
|  | Modifying agent 2 |  |  |  |  |  |  |  |  |  |  |  |
|  | compound K | (mmol) | — | — | — | — | — | — | 13.4 | 26.8 | — | — |
|  | compound L | (mmol) | — | — | — | — | — | — | — | — | 13.4 | — |
|  | compound M | (g) | — | — | — | — | — | — | — | — | — | 5.0 |
|  | compound N | (g) | — | — | — | — | — | — | — | — | — | — |
|  | Onium salt-forming agent |  |  |  |  |  |  |  |  |  |  |  |
|  | silicon tetrachloride | (mmol) | — | — | — | — | — | — | — | — | — | — |
|  | maleic acid | (mmol) | — | — | — | — | — | — | — | — | — | — |
| Crude rubber properties | Bound styrene content | [%] | 25 | 25 | 25 | 25 | 25 | 25 | 25 | 25 | 25 | 25 |
|  | Vinyl content | [%] | 55 | 55 | 55 | 55 | 55 | 56 | 55 | 55 | 55 | 55 |
|  | Weight-average molecular weight before modification | [×10$^4$] | 20 | 20 | 20 | 20 | 20 | 21 | 20 | 20 | 20 | 20 |
|  | Mooney viscosity (ML1 + 4, 100° C.) | [×10$^4$] | 9 | 9 | 10 | 11 | 12 | 13 | 11 | 15 | 12 | 8 |

TABLE 2

|  |  |  | Example 11A | Example 12A | Example 13A | Example 14A | Example 15A | Example 16A | Example 17A | Example 18A | Example 19A | Example 20A |
|---|---|---|---|---|---|---|---|---|---|---|---|---|
| Kind of (modified) conjugated diene polymer |  |  | A11 | A12 | A13 | A14 | A15 | A16 | A17 | A18 | A19 | A20 |
| Polymerization formula | Solvent |  |  |  |  |  |  |  |  |  |  |  |
|  | cyclohexane | (g) | 2500 | 2500 | 2500 | 2500 | 2500 | 2500 | 2500 | 2500 | 2500 | 2500 |
|  | Vinyl content adjuster |  |  |  |  |  |  |  |  |  |  |  |
|  | compound A | (mmol) | 2.45 | 2.45 | 2.45 | 2.45 | 2.45 | 2.45 | 2.45 | 2.45 | 2.45 | 2.45 |
|  | Polymerizing monomer |  |  |  |  |  |  |  |  |  |  |  |
|  | styrene | (g) | 125 | 125 | 125 | 125 | 125 | 125 | 125 | 125 | 125 | 125 |
|  | 1,3-butadiene | (g) | 365 | 365 | 365 | 365 | 365 | 365 | 365 | 365 | 365 | 365 |
|  | further added butadiene | (g) | 10 | 10 | 10 | 10 | 10 | 10 | 10 | 10 | 10 | 10 |
|  | Polymerization initiator |  |  |  |  |  |  |  |  |  |  |  |
|  | n-butyllithium | (mmol) | 5.20 | 5.20 | 5.20 | 5.20 | 5.20 | 5.20 | 5.20 | 5.20 | 5.20 | 5.20 |
|  | piperidine | (mmol) | — | — | — | 4.20 | — | — | — | — | — | 4.20 |
|  | compound B | (mmol) | — | — | — | — | — | — | — | — | 4.20 | — |
|  | End-modifying agent |  |  |  |  |  |  |  |  |  |  |  |
|  | compound C | (mmol) | — | 4.46 | — | — | 2.23 | 4.46 | 2.23 | 4.46 | 4.46 | 4.46 |
|  | compound D | (mmol) | — | — | 4.46 | — | — | — | — | — | — | — |
|  | compound E | (mmol) | — | — | — | 4.46 | — | — | — | — | — | — |
|  | silicon tetrachloride | (mmol) | — | — | — | — | 0.56 | — | 0.56 | — | — | — |

TABLE 2-continued

|  |  |  | Example 11A | Example 12A | Example 13A | Example 14A | Example 15A | Example 16A | Example 17A | Example 18A | Example 19A | Example 20A |
|---|---|---|---|---|---|---|---|---|---|---|---|---|
|  | Modifying agent 1 | | | | | | | | | | | |
|  | compound F | (mmol) | 13.4 | 13.4 | 13.4 | 13.4 | 13.4 | 13.4 | 13.4 | 13.4 | 13.4 | 13.4 |
|  | compound G | (mmol) | — | — | — | — | — | — | — | — | — | — |
|  | compound H | (mmol) | — | — | — | — | — | — | — | — | — | — |
|  | compound I | (mmol) | — | — | — | — | — | — | — | — | — | — |
|  | compound J | (mmol) | — | — | — | — | — | — | — | — | — | — |
|  | Modifying agent 2 | | | | | | | | | | | |
|  | compound K | (mmol) | — | 13.4 | 13.4 | 13.4 | 13.4 | — | — | 13.4 | 13.4 | — |
|  | compound L | (mmol) | — | — | — | — | — | — | — | — | — | — |
|  | compound M | (g) | — | — | — | — | — | 5.0 | 5.0 | — | — | 5.0 |
|  | compound N | (g) | 5.0 | — | — | — | — | — | — | — | — | — |
|  | Onium salt-forming agent | | | | | | | | | | | |
|  | silicon tetrachloride | (mmol) | — | — | — | — | — | — | — | — | — | — |
|  | maleic acid | (mmol) | — | — | — | — | — | — | — | — | — | — |
| Crude rubber properties | Bound styrene content | [%] | 25 | 25 | 25 | 25 | 25 | 25 | 25 | 25 | 25 | 25 |
|  | Vinyl content | [%] | 55 | 55 | 55 | 55 | 55 | 55 | 55 | 55 | 55 | 55 |
|  | Weight-average molecular weight before modification | [×10$^4$] | 20 | 20 | 20 | 20 | 20 | 20 | 20 | 20 | 21 | 20 |
|  | Mooney viscosity (ML1 + 4, 100° C.) | [×10$^4$] | 8 | 12 | 11 | 28 | 55 | 10 | 51 | 12 | 15 | 12 |

TABLE 3

|  |  |  | Example 21A | Example 22A | Comparative Synthetic Example 1 | Comparative Synthetic Example 2 | Comparative Synthetic Example 3 | Comparative Synthetic Example 4 | Comparative Synthetic Example 5 |
|---|---|---|---|---|---|---|---|---|---|
| | Kind of (modified) conjugated diene polymer | | A21 | A22 | B1 | B2 | B3 | B4 | B5 |
| Polymerization formula | Solvent | | | | | | | | |
| | cyclohexane | (g) | 2500 | 2500 | 2500 | 2500 | 2500 | 2500 | 2500 |
| | Vinyl content adjuster | | | | | | | | |
| | compound A | (mmol) | 2.45 | 2.45 | 2.45 | 2.45 | 2.45 | 2.45 | 2.45 |
| | Polymerizing monomer | | | | | | | | |
| | styrene | (g) | 125 | 125 | 125 | 125 | 125 | 125 | 125 |
| | 1,3-butadiene | (g) | 365 | 365 | 365 | 365 | 365 | 365 | 365 |
| | further added butadiene | (g) | 10 | 10 | 10 | 10 | 10 | 10 | 10 |
| | Polymerization initiator | | | | | | | | |
| | n-butyllithium | (mmol) | 5.20 | 5.20 | 5.20 | 5.20 | 5.20 | 5.20 | 5.20 |
| | piperidine | (mmol) | 4.20 | 4.20 | — | 4.20 | — | — | 4.20 |
| | compound B | (mmol) | — | — | — | — | — | — | — |
| | End-modifying agent | | | | | | | | |
| | compound C | (mmol) | 4.46 | 4.46 | — | — | 4.46 | 2.23 | 4.46 |
| | compound D | (mmol) | — | — | — | — | — | — | — |
| | compound E | (mmol) | — | — | — | — | — | — | — |
| | silicon tetrachloride | (mmol) | — | — | — | — | — | 0.56 | — |
| | Modifying agent 1 | | | | | | | | |
| | compound F | (mmol) | 13.4 | 13.4 | — | — | — | — | — |
| | compound G | (mmol) | — | — | — | — | — | — | — |
| | compound H | (mmol) | — | — | — | — | — | — | — |
| | compound I | (mmol) | — | — | — | — | — | — | — |
| | compound J | (mmol) | — | — | — | — | — | — | — |
| | Modifying agent 2 | | | | | | | | |
| | compound K | (mmol) | 13.4 | — | — | — | — | — | — |
| | compound L | (mmol) | — | — | — | — | — | — | — |
| | compound M | (g) | — | 5.0 | — | — | — | — | — |
| | compound N | (g) | — | — | — | — | — | — | — |
| | Onium salt-forming agent | | | | | | | | |
| | silicon tetrachloride | (mmol) | 16.8 | — | — | — | — | — | — |
| | maleic acid | (mmol) | — | 13.6 | — | — | — | — | — |

TABLE 3-continued

| | | | Example 21A | Example 22A | Comparative Synthetic Example 1 | Comparative Synthetic Example 2 | Comparative Synthetic Example 3 | Comparative Synthetic Example 4 | Comparative Synthetic Example 5 |
|---|---|---|---|---|---|---|---|---|---|
| Crude rubber properties | Bound styrene content | [%] | 25 | 25 | 25 | 25 | 25 | 25 | 25 |
| | Vinyl content | [%] | 55 | 55 | 55 | 55 | 55 | 55 | 55 |
| | Weight-average molecular weight before modification | [×10$^4$] | 20 | 20 | 20 | 20 | 20 | 20 | 20 |
| | Mooney viscosity (ML1 + 4, 100° C.) | [×10$^4$] | 75 | 63 | 5 | 6 | 9 | 53 | 10 |

In Tables 1 to 3, abbreviations of the compounds are as follows.
Compound A: 2,2-di(2-tetrafuryl)propane
Compound B: N-(tert-butyldimethylsilyl)piperazine
Compound C: N,N-bis(tromethylsilyl)aminopropylmethyldiethoxysilane
Compound D: S-trimethylsilylmercaptopropyltriethoxysilane
Compound E: N,N,N',N'-tetraglycidyl-1,3-bisaminomethylcyclohexane
Compound F: pinacolborane
Compound G: 9-borabicyclo[3.3.1]nonane
Compound H: diisopropylaluminum hydride
Compound I: bis(cyclopentadienyl)titanium monochloride monohydride
Compound J: bis(cyclopentadienyl)zirconium monochloride monohydride
Compound K: N-[2-[3-(trimethoxysilyl)propylamino]ethyl]ethylenediamine
Compound L: N,N,N',N'-tetrakis(2-hydroxypropyl)ethylenediamine
Compound M: KF-393 (manufactured by Shin-Etsu Chemical Company, Ltd.)
Compound N: MPG-130 (manufactured by Nippon Nyukazai Co., Ltd.)

Production of Polymer Composition and Crosslinked Polymer

Example 1B

Using the above modified conjugated diene polymer A1, a polymer composition was produced by blending individual components according to the blending formula shown in the following Table 4 and kneading them. The kneading was performed by the following method. Using a plastomill (internal volume: 250 ml) equipped with a temperature controller, the modified conjugated diene polymer A, polybutadiene rubber, an extender oil, silica, carbon black, a silane coupling agent, stearic acid, an anti-aging agent, and zinc oxide were blended and kneaded under conditions of a filling rate of 72% and a rotation number of 60 rpm, as first-step kneading. Then, the blended product obtained above was cooled to room temperature, and thereafter kneaded with blending sulfur and a vulcanizing accelerator, as second-step kneading. This was molded, and vulcanized at 160° C. for a predetermined time by means of a vulcanizing press to obtain a crosslinked polymer (vulcanized polymer).

TABLE 4

| Blending formula | Parts by mass |
|---|---|
| Modified conjugated diene polymer | 70 |
| Polybutadiene rubber *1 | 30 |
| Extender oil *2 | 37.5 |
| Silica *3 | 70 |
| Carbon black *4 | 5.6 |
| Silane coupling agent *5 | 5.6 |
| Stearic acid | 2 |
| Anti-aging agent *6 | 1 |
| Zinc oxide | 3 |
| Vulcanizing accelerator D *7 | 1.5 |
| Vulcanizing accelerator CZ *8 | 1.8 |
| Sulfur | 1.5 |

In Table 4, for individual components, the trade names used are as follows. *1: BR01 manufactured by JSR Corporation, *2: JOMO Process NC-140 manufactured by Japan Energy Corporation, *3: ZEOSIL 1165MP manufactured by Rhodia, *4: Diablack N339 manufactured by Mitsubishi Chemical Corporation, *5: Si 75 manufactured by Evonik Industries AG, *6: OZONONE 6C manufactured by Seiko Chemical Co., Ltd., *7: Nocceler D manufactured by Ouchi Shinko Chemical Industrial Co., Ltd., *8: Nocceler CZ manufactured by Ouchi Shinko Chemical Industrial Co., Ltd.

Examples 2B to 22B, Comparative Examples 1B to 5B

Polymer compositions and crosslinked polymers were obtained in the same manner as in the above Example 1B with the exception that the kind of the modified conjugated diene polymer to be used was changed as shown in the following Tables 5 to 8. In Comparative Example 1B, the unmodified conjugated diene polymer B1 was used instead of the modified conjugated diene polymer A1.

TABLE 5

| | Example 1B | Example 2B | Example 3B | Example 4B | Example 5B | Example 6B | Example 7B |
|---|---|---|---|---|---|---|---|
| Kind of polymer | A1 | A2 | A3 | A4 | A5 | A6 | A7 |
| Blend Mooney viscosity (ML1 + 4, 100° C.) | 48 | 49 | 47 | 47 | 46 | 53 | 52 |

TABLE 5-continued

|  | Example 1B | Example 2B | Example 3B | Example 4B | Example 5B | Example 6B | Example 7B |
|---|---|---|---|---|---|---|---|
| 0° C. tan δ (INDEX) | 112 | 111 | 110 | 109 | 108 | 115 | 122 |
| 70° C. tan δ (INDEX) | 112 | 110 | 109 | 109 | 109 | 118 | 125 |

TABLE 6

|  | Example 8B | Example 9B | Example 10B | Example 11B | Comparative Example 1B | Comparative Example 2B |
|---|---|---|---|---|---|---|
| Kind of polymer | A8 | A9 | A10 | A11 | B1 | B2 |
| Blend Mooney viscosity (ML1 + 4, 100° C.) | 57 | 50 | 40 | 41 | 43 | 49 |
| 0° C. tan δ (INDEX) | 126 | 118 | 126 | 124 | 100 | 104 |
| 70° C. tan δ (INDEX) | 128 | 122 | 117 | 117 | 100 | 105 |

TABLE 7

|  | Example 12B | Example 13B | Example 14B | Example 15B | Example 16B | Example 17B | Example 18B |
|---|---|---|---|---|---|---|---|
| Kind of polymer | A12 | A13 | A14 | A15 | A16 | A17 | A18 |
| Blend Mooney viscosity (ML1 + 4, 100° C.) | 83 | 87 | 92 | 95 | 60 | 70 | 86 |
| 0° C. tan δ (INDEX) | 128 | 124 | 122 | 123 | 126 | 124 | 130 |
| 70° C. tan δ (INDEX) | 130 | 125 | 124 | 125 | 120 | 118 | 133 |

TABLE 8

|  | Example 19B | Example 20B | Example 21B | Example 22B | Comparative Example 3B | Comparative Example 4B | Comparative Example 5B |
|---|---|---|---|---|---|---|---|
| Kind of polymer | A19 | A20 | A21 | A22 | B3 | B4 | B5 |
| Blend Mooney viscosity [ML1 + 4, 100° C.) | 96 | 68 | 86 | 69 | 65 | 78 | 72 |
| 0° C. tan δ (INDEX) | 136 | 128 | 131 | 130 | 100 | 98 | 104 |
| 70° C. tan δ (INDEX) | 138 | 124 | 134 | 133 | 100 | 95 | 105 |

<Evaluation>

For respective polymer compositions and crosslinked polymers of the above Examples 1B to 22B and Comparative Examples 1B to 5B, evaluation of properties representing tire performance was carried out as shown below. The evaluation results are shown in the above Tables 5 to 8.

(1) Mooney Viscosity (Blend Mooney Viscosity)

The polymer composition before vulcanization was used as a sample for measurement, and the measurement was carried out in accordance with JIS K6300-1 using an L-rotor under conditions of preheating for 1 minute, a rotor operation time of 4 minutes, and a temperature of 100° C. The smaller the numerical value is, the more satisfactory the workability is.

(2) 0° C. Tan δ

The cross-linked polymer was used as a sample for measurement, and the measurement was carried out under conditions of a shear strain of 0.1%, an angular velocity of 100 radians per second, and 0° C., using ARES-RDA (manufactured by TA instruments Inc.). The measurement results were indicated by indices taking Comparative Example 1B as 100 for Examples 1B to 11B and Comparative Example 2B in which end modification was not performed and taking Comparative Example 3B as 100 for Examples 12B to 22B and Comparative Examples 4B and 5B in which end modification was performed. The larger the numerical value is, the more satisfactory the wet skid resistance is.

(2) 70° C. tan δ

The crosslinked polymer was used as a sample for measurement, and the measurement was carried out under conditions of a shear strain of 1.0%, an angular velocity of 100 radians per second, and 70° C., using ARES-RDA (manufactured by TA instruments Inc.). The measurement results were indicated by indices taking Comparative Example 1B as 100 for Examples 1B to 11B and Comparative Example 2B in which end modification was not performed and taking Comparative Example 3B as 100 for Examples 12B to 22B and Comparative Examples 4B and 5B in which end modification was performed. The larger the numerical value is, the smaller the energy loss is and the more satisfactory the low hysteresis loss properties are.

As shown in Tables 5 and 6, in Examples 1B to 11B, the low hysteresis loss properties and the wet skid resistance were both satisfactory as compared with Comparative Examples 1B and 2B. Also, as shown in Tables 7 and 8, in Examples 12B to 22B, the low hysteresis loss properties and the wet skid resistance were both satisfactory as compared with Comparative Examples 3B to 5B. Moreover, with regard to those in which the compound M or N was used as a modifying agent (second compound) (Examples 10B, 11B, 16B, 17B, 20B, and 22B), it was found that a sufficiently high effect was exhibited as a compatibilizing agent (wetting agent).

The invention claimed is:

1. A method for modifying a conjugated diene polymer obtained by polymerizing a conjugated diene compound or polymerizing a conjugated diene compound and an aromatic vinyl compound, the method comprising:
reacting an active end of the conjugated diene polymer with a third compound having a functional group that interacts with silica;
subsequently reacting an unsaturated binding site in at least one of a skeleton and a side chain of the conjugated diene polymer with a first compound having a boron-hydrogen bond; and
subsequently reacting the conjugated diene polymer with a second compound having a functional group that interacts with silica, the functional group comprising at least one nitrogen atom;
wherein the conjugated diene polymer is a polymer obtained by polymerization in the presence of an alkali metal compound or an alkaline earth metal compound.

2. The method for producing a modified conjugated diene polymer according to claim 1, wherein the third compound is at least one selected from the group consisting of:
(I) a compound (a-1) represented by the following formula (1):

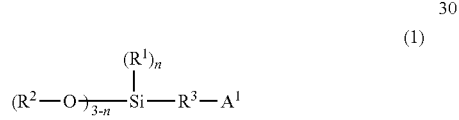

(1)

wherein:
$A^1$ is a monovalent functional group which has at least one atom selected from the group consisting of a nitrogen atom, a phosphorus atom, and a sulfur atom, does not have an active hydrogen, and binds to $R^3$ with the nitrogen atom, the phosphorus atom, or the sulfur atom;
$R^1$ and $R^2$ are each a hydrocarbyl group;
$R^3$ is a hydrocarbylene group; and
n is an integer of 0 to 2;
provided that, when plural $R^1$ and $R^2$ groups are present, the groups $R^1$ and $R^2$ may each be the same or different;
(II) a compound (a-2) having, in the molecule, at least one functional group (x1) selected from the group consisting of a cyclic ether group and a (thio)carbonyl group and a group (x2) different from the functional group (x1), which has at least one atom selected from the group consisting of a nitrogen atom, a phosphorus atom, an oxygen atom, and a sulfur atom and does not have an active hydrogen; and
(III) a compound (a-3) having two or more iso(thio) cyanate groups in the molecule.

3. A method for preparing a polymer composition comprising:
modifying a conjugated diene polymer by the method according to claim 1; and
blending the modified conjugated diene polymer with silica and a crosslinking agent.

4. A method for producing a crosslinked polymer, comprising:
preparing a polymer composition by the method of claim 3; and
cross-linking the polymer composition.

5. A method for producing a tire, comprising:
producing a crosslinked polymer by the method of claim 4;
wherein producing the crosslinked polymer comprises molding the polymer composition and crosslinking to form a tread or a side wall of the tire.

* * * * *